United States Patent
Taguchi et al.

(10) Patent No.: US 7,373,228 B2
(45) Date of Patent: May 13, 2008

(54) SENSOR ID REGISTRATION METHOD OF TIRE AIR PRESSURE MONITORING APPARATUS

(75) Inventors: Akihiro Taguchi, Obu (JP); Shintarou Itou, Kariya (JP); Ryozo Okumura, Kariya (JP)

(73) Assignee: DENSO CORPORATION, Kariya (JP)

( * ) Notice: Subject to any disclaimer, the term of this patent is extended or adjusted under 35 U.S.C. 154(b) by 604 days.

(21) Appl. No.: 10/751,499

(22) Filed: Jan. 6, 2004

(65) Prior Publication Data
US 2004/0138793 A1 Jul. 15, 2004

(30) Foreign Application Priority Data
Jan. 9, 2003 (JP) .............................. 2003-003240

(51) Int. Cl.
*B60C 23/00* (2006.01)
(52) U.S. Cl. .......................................... 701/33; 340/445
(58) Field of Classification Search .................. 701/33, 701/29, 32, 36, 35; 340/445, 446, 447, 448; 73/146.2
See application file for complete search history.

(56) References Cited

U.S. PATENT DOCUMENTS

| 5,602,524 | A | | 2/1997 | Mock et al. |
| 5,612,671 | A | * | 3/1997 | Mendez et al. ............. 340/447 |
| 6,414,592 | B1 | | 7/2002 | Dixit et al. |
| 6,505,507 | B1 | * | 1/2003 | Imao et al. ................. 73/146.5 |
| 6,804,999 | B2 | | 10/2004 | Okubo |
| 2002/0070876 | A1 | * | 6/2002 | Hirohama et al. ...... 340/870.07 |
| 2002/0130771 | A1 | * | 9/2002 | Osborne et al. ............ 340/438 |
| 2003/0000296 | A1 | * | 1/2003 | Schmitt ....................... 73/146 |
| 2003/0080861 | A1 | | 5/2003 | Okubo |

FOREIGN PATENT DOCUMENTS

EP 1 026 015 A2 8/2000

OTHER PUBLICATIONS

Notification of Reason(s) for Refusal from Japanese Patent Office issued on Oct. 3, 2006 for the corresponding Japanese patent application No. 2003-003240 (a copy and English translation thereof).

* cited by examiner

*Primary Examiner*—Dalena Tran
(74) *Attorney, Agent, or Firm*—Posz Law Group, PLC

(57) ABSTRACT

In a method for providing identification registration of a tire air pressure monitoring apparatus, an external equipment receives transmission data including the sensor identification from transmitters. The external equipment identifies the transmitter that transmitted the transmission data based upon the transmission data and registers the identified transmitter at the receiver.

12 Claims, 3 Drawing Sheets

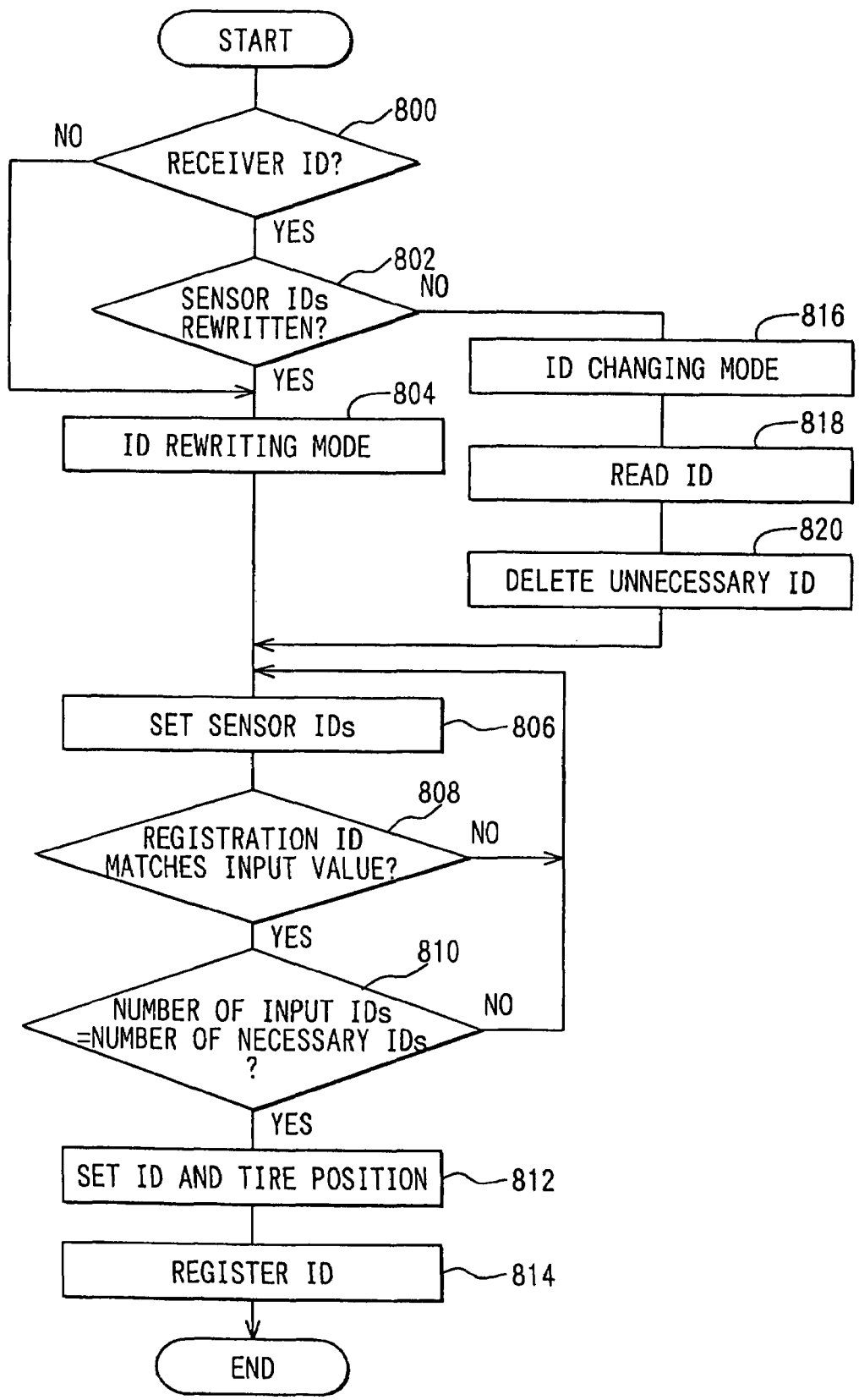

SENSOR ID REGISTRATION METHOD OF TIRE AIR PRESSURE MONITORING APPARATUS

CROSS REFERENCE TO RELATED APPLICATION

This application is based upon, claims the benefit of priority of, and incorporates by reference the contents of, Japanese Patent Application No. 2003-3240 filed on Jan. 9, 2003.

FIELD OF THE INVENTION

The present invention relates to a method of providing sensor ID registration for a tire air pressure monitoring apparatus.

BACKGROUND OF THE INVENTION

A conventional tire air pressure monitoring apparatus, such as that disclosed in Japanese Patent No. 3,212,311, includes a sensor placed in each tire of a vehicle that measures air pressure in the tire and wirelessly transmits the measured value to a receiver provided on a vehicle body side. A receiver identifies the sensor transmitting the transmission data by an identification signal such as a unique previously assigned sensor ID contained in the transmission data and monitors the air pressure in the tire.

However, a problem may occur in the above described tire air pressure monitoring apparatus. When the sensor ID is registered in the receiver, the receiver is set to a registration mode and the transmission data is transmitted from the sensor to the receiver while it is in the registration mode. The sensor ID contained in this transmission data is stored in a memory and its registration is performed.

It is conceivable that the sensor ID registration is performed in many manufacture lines arranged in parallel as shown in FIG. 4, or also in a maintenance facility of a dealer or the like, in which the sensor ID registrations of a plurality vehicles are performed in places adjacent to each other. Therefore, the receiver may erroneously register the sensor ID of the sensor mounted in another vehicle during the registration mode when transmission data is transmitted from a sensor of another adjacent vehicle.

SUMMARY OF THE INVENTION

The present invention has been made in view of the above problem, and has an object to prevent, in a tire air pressure monitoring apparatus, a sensor ID of a sensor mounted in another vehicle from erroneously being registered when a sensor ID is registered.

In order to achieve the above object, according to an aspect of the invention, an external equipment to perform communication with a receiver and a transmitter is used, and the external equipment performs a processing of causing the transmitter to transmit transmission data containing a sensor ID, identifying the transmitter having performed transmission on the basis of the transmitted transmission data, and registering the sensor ID of the identified transmitter into the receiver.

As stated above, the external equipment is used to identify the transmitter having performed the transmission, and the sensor ID of the identified transmitter is registered into the receiver, so that a sensor ID of a sensor mounted in another vehicle is not erroneously registered into the receiver, and the sensor ID of the tire air pressure monitoring apparatus can be accurately registered.

In this case, as in the invention according to another aspect, the identification of the transmitter having performed the transmission can be performed based on whether the sensor ID contained in the transmitted transmission data matches a set sensor ID.

According to another aspect, registration of the sensor ID into the receiver from the transmitter by wireless is inhibited, and then, when the processing of registering the sensor ID is performed, an erroneous registration of the sensor ID can be more certainly prevented. It is preferable that a tire position relation, together with the sensor ID, can also be registered during the registration into the receiver.

According to still another aspect, it is determined whether the sensor ID is registered in the receiver, and when the sensor ID is not registered, a processing of registering the sensor ID is performed with respect to all transmitters of a vehicle, and therefore, the registration of the sensor ID can be performed while a first registration is recognized.

According to still another aspect, when the sensor ID is registered in the receiver, the sensor ID is registered with respect to the transmitter to be changed, and therefore, even in a case where it becomes necessary to change the sensor ID after the first registration by tire exchange or the like, re-registration of the sensor ID can be performed.

Incidentally, in the case where the external equipment is used, as in the invention according to still another aspect, wireless communication can be performed between the transmitter and the external equipment, and wired communication can be performed between the receiver and the external equipment.

BRIEF DESCRIPTION OF THE DRAWINGS

The above and other objects, features and advantages of the present invention will become more apparent from the following detailed description made with reference to the accompanying drawings. In the drawings:

FIG. 3 is a flowchart of a registration processing of a sensor ID performed by the external equipment control circuit.

DETAILED DESCRIPTION OF THE INVENTION

Figure 1:
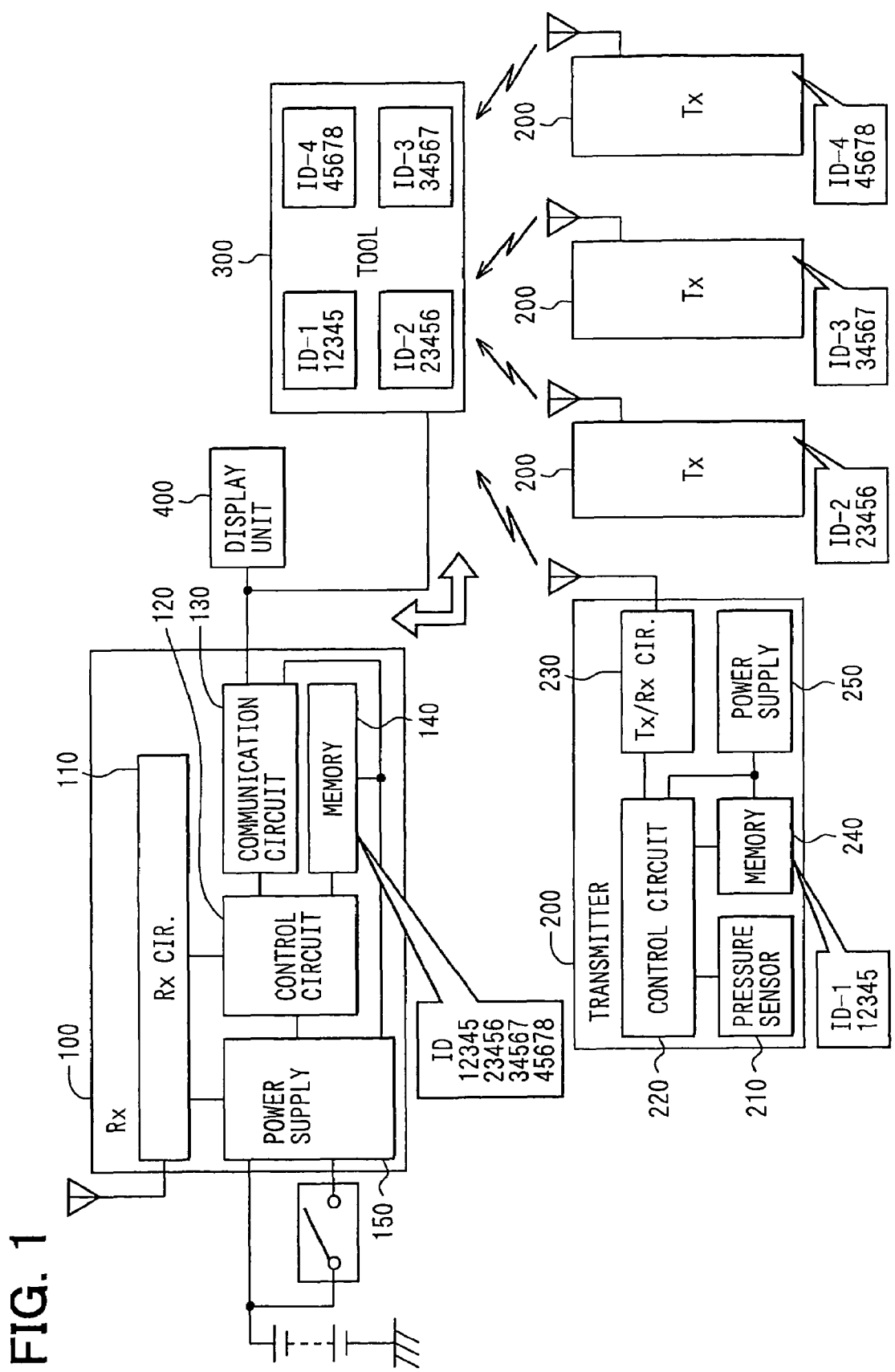
FIG. 1 is a block diagram of a tire air pressure monitoring apparatus.

Referring to the block diagram FIG. 1, a tire air pressure monitoring apparatus is constituted by a receiver (or Rx) 100 for receiving transmission data, a transmitter (or Tx) 200 for transmitting a measured tire air pressure and an external unit 300. The transmitter 200 is disposed in a tire and measures air pressure in the tire. Preferably, the tire air pressure monitoring apparatus includes one or more transmitters for measuring the air pressure of one or more tires, respectively. The transmitter 200 transmits transmission data to the receiver 100 by wireless communication. The receiver 100, which is installed on a vehicle main body side, receives the transmission data from the transmitter 200, identifies the transmitter 200 based on a sensor ID contained in this transmission data, and monitors the air pressure in the tire. The receiver 100 includes a display unit 400 connected thereto.

The transmitter 200 is constituted by a pressure sensor 210, a control circuit 220, a transmission/reception (Tx/Rx) circuit 230, a memory 240, and a power supply 250. The control circuit 220 generates the transmission data based upon the tire air pressure measured by the pressure sensor 210, the sensor ID stored in the memory 240, and the like. This transmission data is modulated by a predetermined modulation approach such as, for example, ASK, FSK, etc, by the Tx/Rx circuit 230 and is transmitted by wireless communication.

The receiver 100 includes a reception circuit (or Rx circuit) 110, a control circuit 120, a communication circuit 130, a memory 140, and a power supply 150. The reception circuit 110 receives the transmission data transmitted by wireless communication from the transmitter 200. The receiver 100 previously stores a correspondence relationship between tire positions and sensor IDs uniquely given to sensors in the memory 140, and identifies one of the sensors fitted in the tires of a vehicle, which has transmitted the received transmission data, based upon this correspondence relationship. When the air pressure in the tire contained in the transmission data is equal to or less than a predetermined reference value, an alarm signal is transmitted from the communication circuit 130 to the display unit 400 connected through a cable.

The display unit 400 is constructed by a lamp provided in a meter. When the alarm signal is transmitted from the receiver 100, the lamp is turned on or is turned on and off. Generally, the lamp generates an indication to cause a driver to recognize the abnormality of the air pressure in the tire.

Figure 2:
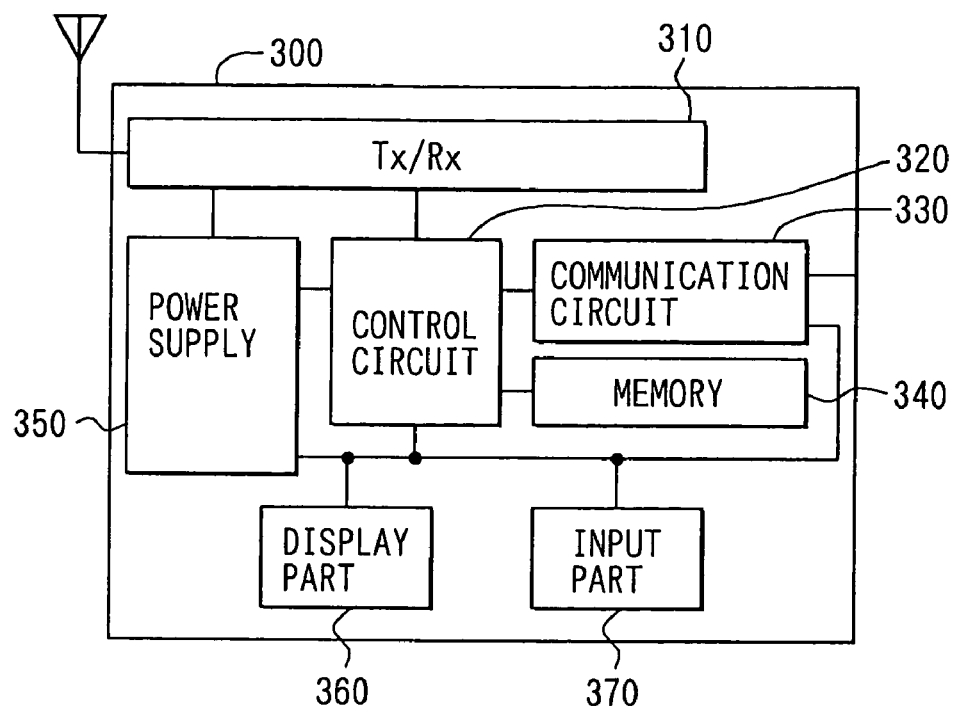
FIG. 2 is a block diagram of an external equipment.
Figure 4:
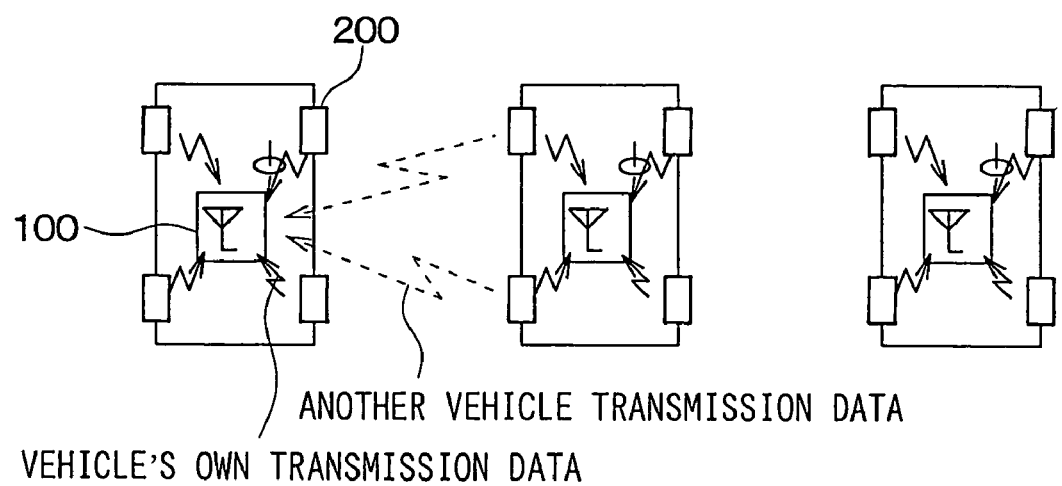
FIG. 4 is an illustration of an example of an erroneous registration of the sensor ID of the sensor mounted in another vehicle that may occur in related art.

In the above tire air pressure monitoring apparatus, when the sensor ID is to be registered in the receiver 100 as shown in FIG. 1, the registration of the sensor ID is performed by using the external equipment 300. The structure of the external equipment 300 is shown in FIG. 2. The external equipment 300 includes a transmission/reception (Tx/Rx) device 310, a control circuit 320, a communication circuit 330, a memory 340, a power supply 350, a display 360, and an input device 370.

The transmission/reception device 310 is constructed to perform bidirectional wireless communication with the transmitter 200. The communication circuit 330 is connected to the receiver 100 preferably through a wired connection such as a cable to perform bidirectional communication with the receiver 100 by the wire. A program for performing a registration processing of the sensor ID and the like is previously stored in the memory 340. In accordance with the program stored in the memory 340, the control circuit 320 causes the display 360 to display confirmation contents as needed, and to perform the registration processing of the sensor ID on the basis of input information from the input device 370.

Referring to FIG. 3, the registration process by which the control circuit (hereinafter referred to as the external equipment control circuit) 320 of the external equipment 300 registers the sensor ID will be discussed. When the registration of the sensor ID is performed, the operator connects the external equipment 300 to the receiver 100 as shown in FIG. 1.

The operator inputs a command for starting the registration of the sensor ID to the input device 370. By this command input, the external equipment control circuit 320 begins a processing in accordance with the program stored in the memory 340. First, the external equipment control circuit 320 transmits the command to the receiver 100. The receiver 100 responsively changes to a setting in which the sensor ID transmitted by wireless from the transmitter 200 is not registered. More particularly, the external equipment 300 initially prohibits the receiver 100 from registering the transmitters 200 by wireless communication.

Then at S800, the external equipment control circuit 320 reads the data stored in the memory 140 of the receiver 100, and determines whether or not the sensor ID is already stored in the memory 140 of the receiver 100. More particularly, the external equipment control circuit 320 determines if a sensor identification of a transmitter of the transmitters 200 has initially been registered at the receiver 100. Here, in the case where the sensor ID has not yet been registered in the memory 140 of the receiver 100, the determination at S800 is NO, and the external equipment control circuit 320 sets an ID rewriting mode (S804).

Next, at S804, the external equipment control circuit 320 enters an ID rewriting mode in which the display 360 displays a screen for input of sensor IDs to be registered and the number of the sensor IDs to be registered. At S806, the external equipment control circuit 320 sets, on the basis of the input of the operator, the sensor IDs to be registered and the number of the sensor IDs to be registered. Generally, an operator sets an identification for a particular transmitter at the external equipment 300. In this case, the operator follows the display screen of the display 360, and inputs the sensor IDs to be registered and the number of the sensor IDs to be registered at the input device 370. For example, as shown in FIG. 1, the operator inputs [12345], [23456], [34567]and [45678] corresponding to the sensor ID-1, ID-2, ID-3 and ID-4 to the input device 370, and inputs [4] as the number of the sensor IDs to be registered to the input device 370. On the basis of an input such as this, the external equipment control circuit 320 sets the sensor IDs to be registered and the number of the sensor IDs to be registered.

Next, the external equipment control circuit 320 causes the transmission/reception part 310 to transmit signals to request the respective transmitters 200 to transmit the sensor IDs. By this, the transmission data containing the sensor IDs are transmitted from the respective transmitters 200.

At S808, the external equipment control circuit 320 receives the transmitted transmission data through the transmission/reception part 310 and determines whether or not the sensor IDs contained in the transmission data transmitted from the respective transmitters 200 match the sensor IDs inputted to the input device 370. At S810, it determines whether or not the number of the matched sensor IDs matches the number of the sensor IDs inputted to the input device 370. Generally, at S808 and S810, a particular transmitter is identified based upon determining whether the sensor identification included in the transmission data matches the identification information set at S806. If the determination for either S808 or S810 is NO, the setting of the sensor IDS performed at S806 is repeated. In this case, the operator follows the display screen of the display 360 and can again input the sensor IDs to be registered and the number of the sensor IDs to be registered.

When the answer to both of the determinations at S808 and S810 is YES, at S812 the external equipment control circuit 320 causes the display 360 to display a screen for input of the relation between the sensor IDs and the tire positions, and sets the relationship between the sensor IDs and the tire positions on the basis of the input of the operator. Here, the operator follows the display screen of the display 360, and inputs the relation between the sensor IDS and the tire positions to the input device 370. For example, the operator inputs a right front wheel, a left front wheel, a right rear wheel and a left rear wheel with respect to ID-1, ID-2, ID-3 and ID-4 to the input device 370. On the basis of the input as stated above, the external equipment control circuit 320 sets the relationship between the sensor IDs and the tire positions.

Then, at S814, the external equipment control circuit 320 causes the transmission/reception part 310 to transmit to the receiver 100 the data containing the sensor IDS, the number of the sensor IDS, and the relationship of the tire positions. By this, the control circuit 120 of the receiver 100 stores the sensor IDS, the number of the sensor IDs, and the relationship of the tire positions into the memory 140 on the basis of the data transmitted from the external equipment 300 and registers the sensor IDs.

In this way, the registration operation of the sensor IDs is ended. After the registration operation is ended, the external equipment 300 is preferably removed from the receiver 100.

After the first registration as set forth above, when it becomes necessary to again register the sensor ID by tire exchange or the like, re-registration of the sensor ID can be performed by using the external equipment 300. However, in the case of the re-registration, since the sensor IDS are already stored in the memory 140 of the receiver 100, the determination at S800 becomes YES. In this case, at S802 the external equipment control circuit 320 causes the display 360 to display a selection screen for selection between an ID rewriting mode to rewrite the sensor IDS of all the transmitters 200 and an ID changing mode to change only a sensor ID of a specific transmitter 200, and determines the operator selection.

When the operator selects the ID rewriting mode, the processing subsequent to S804 is performed, and similarly to the first registration, the sensor IDs of all the transmitters 200, the number of the sensor IDS, and the relation of the tire positions are newly stored in the memory 140.

When the operator selects the ID changing mode, at S816 the external equipment control circuit 320 sets the ID changing mode. Next, at S818 the external equipment control circuit 320 reads out the sensor IDS stored in the memory 140 of the receiver 100, and causes the display 360 to display them. The operator selects the sensor ID to be changed among the sensor IDS displayed on the display 360. At S820, The external equipment control circuit 320 deletes the sensor ID selected by the operator from the memory 140 of the receiver 100.

Next, at S806 the external equipment control circuit 320 causes the display 360 to display a screen for input of the sensor IDs to be registered, the number of the sensor IDs to be registered, and sets the sensor IDS to be registered and the number of the sensor IDS to be registered on the basis of the input by the operator. In this case, the sensor IDS that are not to be changed are previously displayed on the screen, and only the sensor IDS to be newly registered and the number of the sensor IDS are inputted. More generally, when it is determined at S800 that the initial transmitter identification for the transmitter has been registered at the receiver 100, a new transmitter identification for the transmitter is registered if the transmitter has been selected to be rewritten.

Thereafter, the external equipment control circuit 320 executes the processing subsequent to S808. In this case, at the processing of S812 and S814, the relationship between the sensor IDs and the tire positions is set only for the sensor IDs to be newly registered, and is stored in the memory 140.

According to the above embodiment, the external equipment 300 to perform the communication with the receiver 100 and the transmitter 200 is used, the sensor IDs to be registered are set in this external equipment 300, the external equipment 300 causes the transmitter 200 to transmit the transmission data containing the sensor ID, it is determined whether or not the sensor ID contained in the transmission data transmitted from the transmitter matches the set sensor ID, and in the case where they match each other, the sensor ID is registered through the communication with the receiver 100, and therefore, a sensor ID of a sensor mounted in another vehicle is not erroneously registered, and the sensor ID of the tire air pressure monitoring apparatus can be accurately registered.

Incidentally, in the above embodiment, the description has been given to the case where the determination is made as to whether the sensor ID contained in the transmission data transmitted from the transmitter matches the set sensor ID to identify the transmitter having performed the transmission. However, the transmitter having performed the transmission may be identified on the basis of data other than the sensor ID contained in the transmission data.

In the above embodiment, although the description has been given to the case where the operator performs various setting inputs to the external equipment 300, data may be automatically set with respect to all of or some of them.

Also, although the description has been given to the example in which the transmission data are transmitted from the respective transmitters 200 in accordance with the transmission instruction from the external equipment 300 by wireless communication, the transmitter 200 is provided with a connection terminal at a position where connection is enabled from the outside of the tire, for example, a vicinity of an air injection port of the tire, and the transmission instruction may be performed from the external equipment 300 to the transmitter 200 by a wired connection through this connection terminal. Both communication between the external equipment 300 and the receiver 100 and communication between the external equipment 300 and the transmitter 200 may be performed by wireless communication. In this case, it is preferable that the communication between the external equipment 300 and the receiver 100 uses a radio frequency different from a frequency with which the transmitter 200 transmits the transmission data.

Further, although the description has been given in view of eliminating the problem of registering the sensor ID of the transmitter mounted in another vehicle erroneously into the memory 140 of the receiver 100. In addition, the program stored in the memory 340 of the external equipment 300 may be initialized so that the receiver 100 is set not to register the sensor ID from the transmitter 200 by wireless communication. The receiver 100 may detect the air pressure in the tire by radio transmission transmitted from the transmitter 200 even in the period when the sensor ID is registered in accordance with this program.

Therefore, the present disclosure concerns a method for providing identification registration for a tire air pressure monitoring apparatus. The tire air pressure monitoring apparatus is comprised of a plurality of transmitters 200 and a receiver 100. The method comprises receiving a plurality of sensor identification data from the plurality of transmitters, respectively, wherein each of the sensor identification data identifies a sensor at a respective one of the plurality of transmitters at S808. Each of the plurality of transmitters from the plurality of sensor identification data is identified by determining if each of the plurality of sensor identification data matches with each of a plurality of set identification data stored in a receiver memory and repeating the identifying if no match is determined at S810. The identified plurality of transmitters are registered at the receiver at S814. A relationship between the plurality of transmitters 200 and respective tire positions is set at S812. Preferably, the registering of the identified plurality of transmitters performed at S814 further includes registering the relationship of the tire position together with the identified transmitters. At S800, it is determined if each of the plurality of transmitters 200 has initially been registered at the receiver 100. The above described registration of the sensor identification for the each of the plurality of transmitters 200 is performed when the each has been determined not to have been initially registered. However, when it is determined that the each of the plurality of transmitters has been initially registered at the receiver at S800, a new transmitter identification for each of the plurality of transmitters 200 is registered if the each or some or one of the plurality of transmitters 200 has been selected to be rewritten (see S802).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for providing registration of a sensor identification associated with a tire air pressure monitoring apparatus, the tire air pressure monitoring apparatus comprising a transmitter for measuring tire air pressure and for transmitting transmission data including measured air pressure and the sensor identification in a communication to a receiver and an external unit, the method comprising:

receiving at the external unit the transmission data including the sensor identification from the transmitter;
   identifying the transmitter that transmitted the transmission data based upon the transmission data, wherein the identifying includes:
   comparing the sensor identification with a previously set sensor identification;
   registering the sensor identification in the receiver through a communication between the external unit and the receiver if the sensor identification matches the previously set sensor identification;
   determining if the transmitter has initially been registered at the receiver; and
   registering the sensor identification for the transmitter when the transmitter has been determined not to have been initially registered;
   wherein when it is determined that the transmitter has been initially registered at the receiver, registering a new transmitter identification for the transmitter if the transmitter has been selected to be rewritten.

2. The method of claim 1, further comprising initially prohibiting the receiver from registering the transmitter by wireless communication.

3. The method according to claim 1, further comprising setting a relationship between the transmitter to be registered and a tire position and subsequently registering the relationship of the tire position together with the identified transmitter at the receiver.

4. A method according to any one of claim 1, wherein communication between the transmitter and the external unit is performed by wireless communication, and communication between the receiver and the external unit is performed by a wired connection.

5. A method for providing identification registration for a tire air pressure monitoring apparatus, the tire air pressure monitoring apparatus comprised of a plurality of transmitters and a receiver, the method comprising:

receiving a plurality of sensor identification data from the plurality of transmitters, respectively, wherein each of the sensor identification data identifies a sensor at a respective one of the plurality of transmitters;
   identifying each of the plurality of transmitters from the plurality of sensor identification data, wherein the identifying comprises determining if each of the plurality of sensor identification data matches with each of a plurality of set identification data stored in a receiver memory and repeating the identifying if no match is determined;
   registering the identified plurality of transmitters at the receiver;
   determining if each of the plurality of transmitters has initially been registered at the receiver;
   registering the sensor identification for the each of the plurality of transmitters when the each has been determined not to have been initially registered; and
   wherein when it is determined that the each of the plurality of transmitters has been initially registered at the receiver, registering a new transmitter identification for the each of the plurality of transmitters if the each of the plurality of transmitters has been selected to be rewritten.

6. The method of claim 5, further comprising setting a relationship between the plurality of transmitters and respective tire positions, wherein the registering of the identified plurality of transmitters further includes registering the relationship of the tire position together with the identified transmitters.

7. A method for registering a sensor associated with a tire air pressure monitoring apparatus, the tire air pressure monitoring apparatus comprising a transmitter for measuring tire air pressure and for transmitting data including measured air pressure and sensor identification data to a receiver, the method comprising:

entering sensor identification information that identifies the sensor into an external unit, which is separate from the receiver and communicates with the receiver;
   transmitting data including the sensor identification data from the transmitter to the external unit;
   receiving the sensor identification data with the external unit and storing the sensor identification data in the external unit;
   with the external unit, determining whether the sensor identification data received by the external unit from the transmitter and the previously entered sensor identification information identify the same transmitter;
   registering the sensor in the receiver through a communication between the external unit and the receiver if it is determined that the sensor identification data and the sensor identification information identify the same transmitter.

8. The method of claim 7, wherein the method includes, prior to entering the sensor identification information in the external unit, prohibiting the receiver from registering the transmitter by wireless communication between the transmitter and the receiver.

9. The method according to claim 7, further comprising, prior to registering the transmitter, setting a relationship between the transmitter and a tire position and subsequently registering the relationship together with the transmitter in the receiver.

10. The method according to claim 7, wherein communication between the transmitter and the external unit is performed wirelessly.

11. The method according to claim 7, wherein communication between the receiver and the external unit is performed by a wired connection.

12. The method according to claim 11, wherein, prior to registering the transmitter, connecting the external unit to the receiver to form the wired connection.

* * * * *